US011461406B2

(12) United States Patent
Roberts et al.

(10) Patent No.: US 11,461,406 B2
(45) Date of Patent: Oct. 4, 2022

(54) SYSTEM AND METHOD FOR IDENTIFYING NEWLY TRENDING TOPICS IN A DATA STREAM

(71) Applicant: Verint Systems UK Limited, Cambridge (GB)

(72) Inventors: David Andrew Roberts, Cambridge (GB); David Alexander Sim, Cambridge (GB)

(73) Assignee: Verint Systems UK Limited, Cambridge (GB)

( * ) Notice: Subject to any disclaimer, the term of this patent is extended or adjusted under 35 U.S.C. 154(b) by 60 days.

(21) Appl. No.: 16/725,045

(22) Filed: Dec. 23, 2019

(65) Prior Publication Data
US 2020/0218761 A1 Jul. 9, 2020

(30) Foreign Application Priority Data
Dec. 31, 2018 (GB) ...................................... 1821318

(51) Int. Cl.
G06F 16/906 (2019.01)
G06F 16/35 (2019.01)
G06F 16/903 (2019.01)

(52) U.S. Cl.
CPC .......... *G06F 16/906* (2019.01); *G06F 16/353* (2019.01); *G06F 16/355* (2019.01); *G06F 16/90344* (2019.01)

(58) Field of Classification Search
CPC .... G06F 16/906; G06F 16/355; G06F 16/353; G06F 16/90344
See application file for complete search history.

(56) References Cited

U.S. PATENT DOCUMENTS 1,003,692 A 9/1911 Bennet
8,898,296 B2 11/2014 Zeng et al.
(Continued)

OTHER PUBLICATIONS

Hawwash et al., "Published By ACM Stream-dashboard: a framework for mining, tracking and validating clusters in a data stream", BigMine '12: Proceedings of the 1st International Workshop on Big Data, Streams and Heterogeneous Source Mining: (Year: 2012).*
(Continued)

*Primary Examiner* — Mark D Featherstone
*Assistant Examiner* — Kweku William Halm
(74) *Attorney, Agent, or Firm* — Christopher M. Scherer; DeWitt LLP (57) ABSTRACT

A system, computer implemented method, and computer storage medium encoded with a computer program, for identifying newly trending topics in a data stream. An example method includes: receiving text documents forming part of a data stream from one or more servers; identifying terms within the received text documents; deriving from the identified terms, a set of terms identified as abnormal by virtue of having a relatively high frequency of occurrence within the text documents received in a recent period compared with that expected from their historic occurrence; creating a first set of one or more clusters, each cluster including a group of terms from the set of terms identified as abnormal which through their degree of co-occurrence in the received text documents are considered to relate to the same topic; and comparing clusters of a further set with the clusters of the first set to determine whether a cluster of the further set pertains to the same topic.

13 Claims, 4 Drawing Sheets

(56) References Cited

U.S. PATENT DOCUMENTS

| | | | |
|---|---|---|---|
| 9,002,843 B2 | 4/2015 | Itoh et al. | |
| 2007/0223699 A1* | 9/2007 | Jones | G06F 16/2477 |
| | | | 380/262 |
| 2011/0213583 A1* | 9/2011 | Mao | G01S 5/0252 |
| | | | 702/150 |
| 2012/0259855 A1* | 10/2012 | Mizuguchi | G06F 16/355 |
| | | | 707/739 |
| 2013/0151525 A1* | 6/2013 | Ankan | G06F 40/30 |
| | | | 707/737 |
| 2013/0275527 A1* | 10/2013 | Deurloo | G06F 16/9535 |
| | | | 709/206 |
| 2017/0116204 A1* | 4/2017 | Davulcu | G06F 16/355 |
| 2017/0286516 A1* | 10/2017 | Horowitz | G06F 11/3006 |
| 2018/0322363 A1* | 11/2018 | Urmanov | G06F 17/16 |

OTHER PUBLICATIONS

Chen et al., "HE-Tree: a framework for detecting changes in clustering structure for categorical data", The VLDB Journal—The International Journal on Very Large Data Bases, vol. 18, Issue 6Dec. 2009, pp. 1241-1260 (Year: 2009).*

* cited by examiner

SYSTEM AND METHOD FOR IDENTIFYING NEWLY TRENDING TOPICS IN A DATA STREAM

CROSS-REFERENCE TO RELATED APPLICATIONS

This application is based upon and claims priority to UK Patent Application No. 1821318.1 filed on 31 Dec. 2018, the disclosure of which being hereby incorporated by reference in its entirety.

BACKGROUND

The present invention relates to a system and method for identifying newly trending topics from a data stream of textual information. A topic may, for example, relate to one or more of an event, a person, company, product or service offering that is subject of one or more of text documents within the data stream. The textual information may be derived or comprise text documents such as social media posts and electronic messages (emails, blog posts, etc.).

There are various reasons why it can be advantageous to identify trending topics i.e. topics that are currently widely discussed. For example, it can be used by a company to identify problems with a service or product offerings early on, allowing the company to act promptly, e.g. to rectify the problem and/or assuage customer concerns, in order to limit damage to its reputation.

A standard approach is to identify as 'abnormal' terms occurring within the data stream with unusually high frequency and to provide an alert when new abnormal terms are identified. It is common for people to use different terms when referring to a single topic and so this approach, when used alone, leads to the generation of multiple unwanted alerts for a single topic.

A known solution is to cluster terms identified as relating to a single topic. There are various well known clustering algorithms for this purpose. Notwithstanding, this does not entirely eliminate the generation of spurious alerts because terms used in reference to a topic often change over time leading to the formation of multiple clusters for the same topic.

BRIEF SUMMARY

According to a first aspect of the invention there is provided a system comprising
a client device; and
a computer-readable medium coupled to the client device having instructions stored thereon which, when executed by the client device, cause the client device to perform operations comprising:
receiving text documents forming part of a data stream from one or more servers;
identifying terms within the received text documents;
deriving from the identified terms, a set of terms identified as abnormal by virtue of having a relatively high frequency of occurrence within the text documents of the data stream received in a first recent period compared with that expected from their historic occurrence;
creating a first set of one or more clusters, each cluster comprised from a group of terms from the set of terms identified as abnormal which through their degree of co-occurrence in the received text documents are considered to relate to the same topic;

deriving from the identified terms, a further set of terms identified as abnormal by virtue of having a relatively high frequency of occurrence within the text documents of the data stream received in a second recent period compared with that expected from their historic occurrence;
creating a further set of one or more clusters; each cluster comprised from a group of terms from the further set of terms identified as abnormal which through their degree of co-occurrence in the received text documents are considered to relate to the same topic;
comparing each of the one or more clusters of the further set with each of the one or more clusters of the first set to determine whether a cluster of the further set pertains to the same topic as a cluster of the first set, and
where a cluster of the further set does not pertain to any of the topics of the clusters of the first set, adding that cluster to the first set of clusters.

The feature described at ii) may further comprise associating with each identified term:
an identifier for each text document in which the term is found, and
time information associated with each text document in which the term is found.

The client device may further be caused to perform operations comprising:
generating a model for each term indicative of the historical occurrence of the term within the data stream;
for each term, determining an indicator of frequency that the term has occurred within the received text documents from the data stream within the first recent period;
comparing the indicator of the frequency for a term with the relevant model for that term, and using the comparison to apply an abnormality score to the term; the abnormality score being indicative of the extent to which the term's frequency within the recent period is predicted by the model; and
using the abnormality scores to determine the set of terms that are abnormal by virtue of having a relatively high frequency of occurrence in the recent period compared with that predicted by the model.

The system may determine a new indicator of the frequency for each term based on the frequency that the term has occurred within received text documents from the data stream within the second recent period; using the new indicators of frequency to update the models and abnormality scores for the terms and using the updated models and abnormality scores to determine the terms that make up the further set of abnormal terms.

The system may output information to an external computer system, e.g. to prompt a change in behavior of the external computer system, the information relating to a cluster of the further set that is determined not to relate to a topic of the clusters of the first set and thus has been added to the clusters of the first set.

For example the information may include the terms of the new cluster and/or other topic information derived therefore. The information may include text content of, or an address to, one or more of the text documents which are determined to relate to the topic of the cluster, e.g. the text documents received within the second recent period in which two or more terms of the new cluster co-occurred.

As such the system may act as a filter selecting to output information only pertaining to new clusters that do not relate to a topic of the clusters of the first set are outputted. Alternatively, the system may output information relating to all clusters of the further set together with further information indicating whether the cluster relates to the same topic of a cluster of the first set or not.

The external system may comprise an electronic messaging system e.g. electronic messaging server such as email server or SMS system. The information received by the electronic messaging system may be used for the purpose of generating and/or sending an electronic message, e.g. to one or more responsible persons, and/or creating a filter to filter electronic messages received by the electronic messaging system. Where the latter, the filter may act to sort and optionally redirect received electronic messages deemed to relate to the topic of the new cluster sorting.

The invention thereby acts to reduce the likelihood of alerts being generated multiple times for the same topic and thus reducing the likelihood of the external system acting multiple times, e.g. sending multiple emails, for the same topic.

BRIEF DESCRIPTION OF THE DRAWINGS

The invention will now be described by way of example with reference to the accompanying figures, which together with the detailed description below are incorporated in and form part of the specification, in which.

DETAILED DESCRIPTION

As required, detailed embodiments are disclosed herein; however, it is to be understood that the disclosed embodiments are merely examples and that the devices, systems and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any appropriately detailed structure and function. Further, the terms and phrases used herein are not intended to be limiting, but rather, to provide an understandable description. Additionally, unless otherwise specifically expressed or clearly understood from the context of use, a term as used herein describes the singular and/or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising i.e., open language. The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function.

Figure 1:
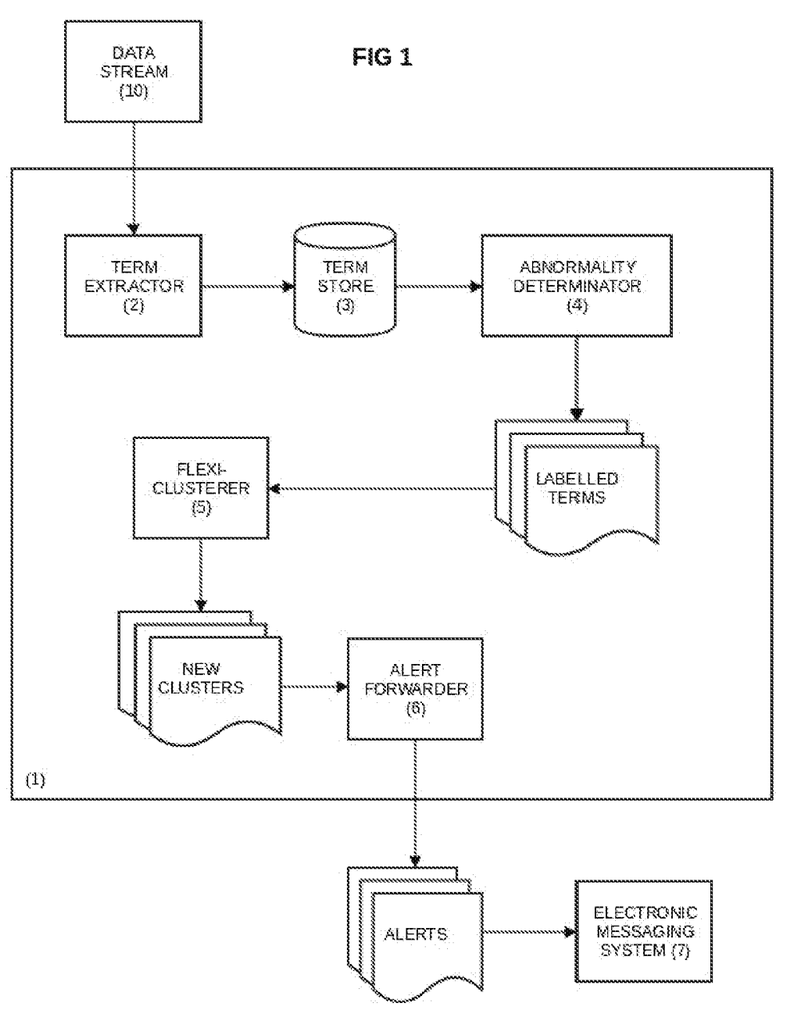
FIG. 1 is a schematic of a system for identifying trending topics in a data stream and providing information relating to newly identified treading topics to an electronic messaging system.

With reference to FIG. 1 there is shown a system 1 arranged to receive a data stream 10 comprising text documents via a local network and/or the internet from one or more servers, to identify trending topics from the content of the received text documents and to provide an alert to an electronic messaging system 7 in response to identifying a newly trending topic, the alert comprising information to identify the newly trending topic.

The system 1 is realized in a combination of hardware and software. Any kind of computer system—or other apparatus adapted for providing the functional units and carrying out methods described herein—is suitable. A typical combination of hardware and software could be a general purpose computer system with a computer program that, when being loaded and executed, controls the computer system such that it carries out the methods described herein The system 1 comprises a term extractor 2, term store 3, abnormality determiner 4, a flexi-clusterer 5, and alert generator 6.

The term extractor 2 is arranged to receive textual data e.g. comprising or derived from text documents, from a data stream 10. The text documents may comprise one or more of: social media postings, emails and customer completing records. The text documents may not consist entirely of text, though for the current embodiment it is only the textual content of the text document that is of interest.

The sources used to provide the text documents of the data stream 10 are selected for their likelihood to provide content relating to topics relevant to the user of the system 1. For example, where the system 1 is used by a company, the sources that provide the text documents that make up the data stream 10 may be selected for having a high likelihood of providing text documents to topics relevant to the company, such as one or more of its products and/or services, about the company per se or otherwise be relevant to the company's business interests or reputation, e.g. relate to a senior employee of the company and/or to the commercial sector to which the company belongs. For example, the data stream may be restricted to text documents derived from one or more of: social media posts from certain accounts and/or comprising particular hashtags, and emails received by the company e.g. its customer services department The term extractor 2 uses one or more of: tokenization, stop-word removal, stemming, lemmatization and form joining processes (all of which are well known to those skilled in the art), to extract text fragments (which may be one or more words and hereinafter referred to as terms) of potential relevance from each text document received from the data stream 10. The extracted terms are stored in the term store 3 and associated with identifiers (Ids) of each text document that the term occurs within and time information related to each of those text documents. The time information favorably relates to the creation time of the text document, the sent or received time of an email or, less favorably, the time it was received by the system 1. There are various ways in which the extracted information can be held in the term store, e.g., each instance of a term may be held as individual item within its associated data, as a string, or the information may be consolidated as a table. The form chosen is not important.

The abnormality determiner 4 determines for each unique term in the term store 3 whether within a recent time period any of the terms have occurred in the data stream with abnormally high frequency compared with that expected from their historic behavior; such terms are determined as abnormal.

The abnormality determiner 4 makes determinations from time-to-time in order to identify new abnormal terms as the term store 3 is updated by the term extractor 2.

The flexi-clusterer 5 acts to perform a cluster operation with the terms identified by the abnormality determiner 4 as abnormal, to create one or more clusters, each cluster relating to a single topic. The flexi-clusterer 5 acts to compare newly created clusters formed following an update of the abnormal terms by the abnormality determiner 4, with existing clusters formed earlier by the abnormality score for a prior recent time period, to identify whether each new cluster relates to the same topic as any of the existing clusters.

New clusters which do not pertain to any of the topics of the existing clusters are considered to relate to a newly trending topic and information pertaining the these clusters are passed to an alert generator 6 which in response transmits an alert forming an output of the system, the alert comprising information relating to a new cluster, e.g., the terms of the new cluster, an indicator of the topic of the cluster, textual content of one or more text documents identified subject of the topic of the cluster, and address information relating to one or more of these text documents. Through comparison of new clusters with existing clusters it is possible avoid sending alerts for new cluster which relate to topics for which an alert has already been sent by the system, thus avoiding the triggering of multiple alerts stemming from a single topic.

The alert outputted by the alert generator is received by an electronic messaging system 7, e.g. an email server or SMS system, which may use the details of the new cluster to undertake an action comprising, for example, one or more of sending an electronic message, e.g. an email and/or SMS to one or more responsible persons; automatic creation of a filter to filter electronic messages addressed to one more specific addresses, the filter may act to redirect received electronic messages deemed to relate to the topic of the new cluster.

Figure 2:
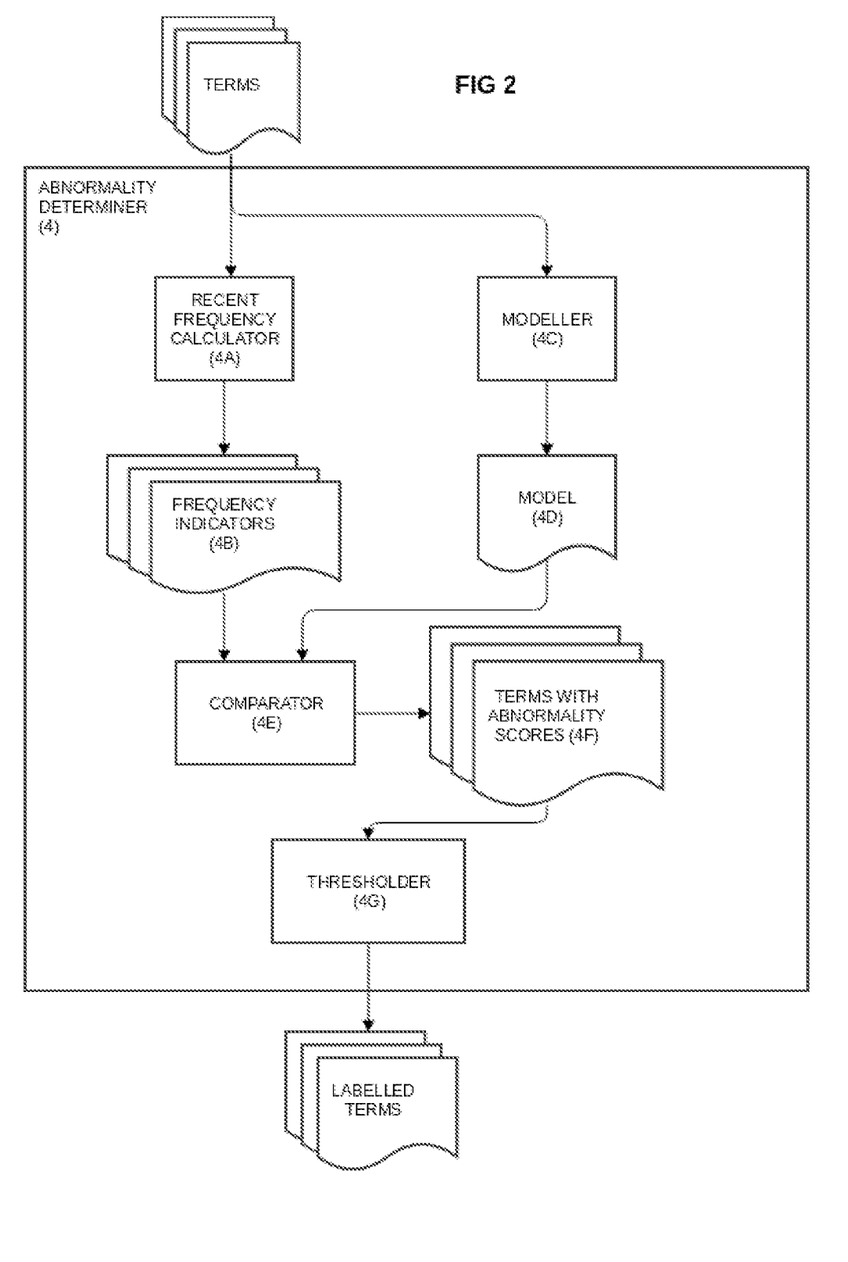
FIG. 2 is a schematic of functions of an abnormality determiner of the system of FIG. 1.

FIG. 2 illustrates in more detail the functions of the abnormality determiner 4 which comprise a recent frequency calculator 4A, modeller 4C, comparator 4E and thresholder 4G.

From time-to-time the recent frequency calculator 4A determines for each term held within the term store 3a frequency indicator 4B. The frequency indicator 4B represents the frequency with which the term occurred within the data stream 10 (e.g., the number of text documents in which the term occurred) in a recent time period, e.g. the last hour, preceding the current determination.

A modeller 4C derives for each term in the term store 3, using the time information associated with the term, a statistical model 4D describing the pattern of occurrences of the term in the data stream 10 over a historic period which will include occurrences of the term within the term store 3 before the recent period used by the recent frequency calculator 4A. For example, in an embodiment in which recent frequency calculator 4A determines a frequency indicator 4B based on the occurrence of a term found in the data stream in the last sixty minutes (the recent period), the historic period may be chosen to be the 60 minutes, two hours, day, week or other preferred length of time preceding the start of the recent period.

The modeller 4C may generate a model for a new term added to the store 3 or update a model for an existing term, from time-to-time and/or in conjunction with the creation of a new frequency indicator 4B for a term.

The statistical model 4D is preferably a binomial model but other model types may be used instead.

A comparator 4E compares, for each term in store 3, the term's frequency indicator 4B with the model 4D for that term and in response outputs an abnormality score 4F indicative of the extent to which the frequency indicator 4B represents a statistically significant increase in the frequency that the term occurred in the data stream 10 during the recent period relative to the frequency predicted by the model 4D.

A thresholder 4G labels terms to identify those which are considered abnormal. This is done by determining whether a term's abnormality score 4F surpasses a threshold score. A suitable threshold score can be determined during initial calibration of the system.

The label may be added to the term's entry in the store 3 together with its abnormality score. Alternatively the abnormality determiner's 4 output may be used populate a list of terms determined to be abnormal together with their respective abnormality scores. This list may also be stored in store 3.

Figure 3:
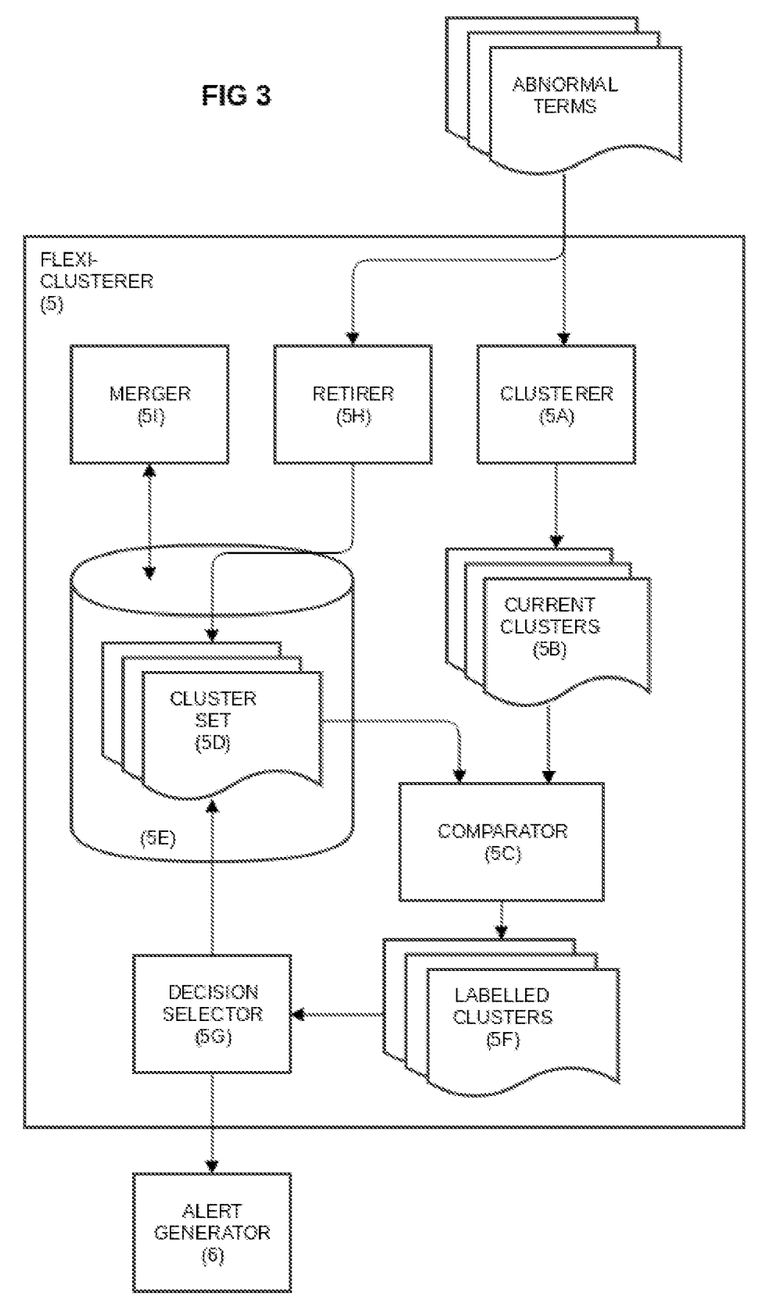
FIG. 3 is a schematic of the functions of a flexi-clusterer of the system of FIG. 1.

With reference to FIG. 3, the terms labelled as abnormal are passed to the flexi-clusterer 5. A clusterer 5A of the flexi-clusterer 5 receives the terms and clusters them using a standard clustering algorithm such as, for example, K-Means, Expectation-Maximization or Mean-Shift, with a distance function based on text document co-occurrences. Co-occurrence of terms within the same document can be determined by the Ids associated with each term in the store 3.

The clusterer 5A outputs one or more clusters 5B, each determined by the clustering algorithm to relate to a different topic. Each cluster 5B comprises a group of abnormal terms together with their respective abnormality scores at the time the cluster 5B was created.

A comparator 5C compares each cluster (hereinafter referred to as a new cluster) outputted from the clusterer 5A with a set of existing clusters 5D held in a store 5E. Each existing cluster is a cluster that was previously created by the clusterer 5A and for which the system 1 has already generated an alert. Each of the existing clusters within the set of existing clusters 5D has been previously determined by the comparator 5C to relate to a different topic.

The comparator 5C determines whether a new cluster outputted from the clusterer 5A relates to the same topic as one of the existing clusters in the set of existing clusters 5D. The comparison of the two clusters comprises representing each as vectors of their component terms weighted by each term's respective abnormality score at the time the cluster was formed(or updated), and then calculating the cosine similarities of the two clusters.

As the abnormality level of a term will typically change over time, a term common to two clusters may have different abnormality scores associated with it in each cluster.

If the cosine distance falls below a threshold the two clusters being compared are deemed to relate to the same topic. The comparator 5C outputs the new cluster together and where it is deemed to relate to the same topic of an existing cluster from set of cluster 4D, an indicator of that existing cluster.

Figure 4:
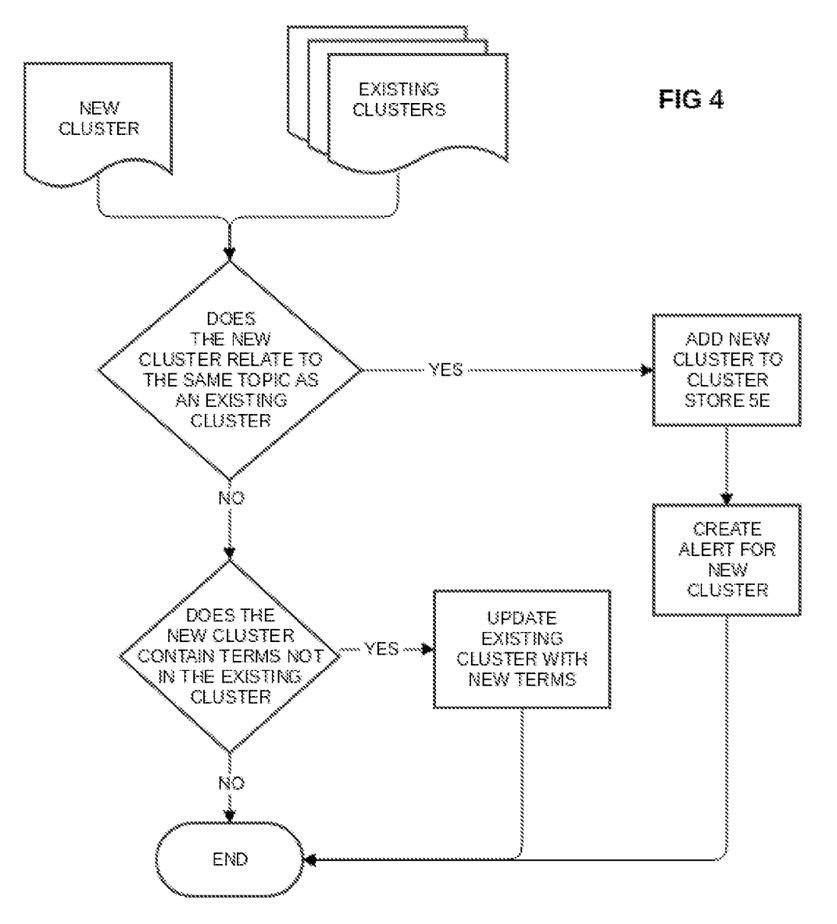
FIG. 4 is a flow chart of actions carried out by the comparator and decision selector of the flexi-clusterer of FIG. 3.

With reference to FIG. 4, the new clusters 5F together with any indicators are passed to a decision selector 5G. If the new cluster does not relate to any of the existing clusters of set 5D the decision maker 5G acts to add the new cluster to the set of clusters 5D in store 5E and passes the new cluster and/or details of the cluster to an alert generator 6.

During the first iteration of the system 1, there will be no existing clusters within the store 5E and so all new clusters will be considered to relate to new topics and will be added to the store 5E.

If a new cluster is deemed to relate to the same topic as one of the existing clusters, the decision selector acts to update the relevant existing cluster in store 5E. This may include: adding terms from the new cluster into the existing cluster, replacing terms in the existing cluster with those from the new cluster, and/or updating abnormality scores using the values from the new cluster.

This process ensures that new clusters are not used to generate alerts where they relate to topics for which an alert has already been generated. Additionally it enables clusters held in the store 5E to evolve to reflect changes in the characteristics of a topic over time.

The flexi-clusterer further includes a retirer 5H. The retirer 5H functions to identify existing clusters 5D held within store 5E that by virtue of their abnormality scores having changed no longer comprise any terms which are have been identified as abnormal and thus indicative that the topic is not being widely discussed and therefore no longer of interest. Existing clusters identified as no longer comprising any abnormal terms are removed from the store 5E. This ensures that the system is able to respond and send an alert should the same topic starts to trend again in the future.

The flexi-clusterer further includes a merger function 51, the merger 51 acts to compare existing clusters within the store 5E from time-to-time, using the same comparison process used by the comparator 5C in order to identify whether any of the existing clusters relate to the same topic. This may occur as a result of the evolution of existing clusters over time. Where two existing clusters are identified as relating to the same topic the merger checker merges the two existing clusters.

It will be appreciated that variations to the afore described example are possible. For example, text documents received from the data stream 10 may be first transferred to a persistent memory store before being processed by the term extractor 2. This allows the term extractor to carry out its extraction processes periodically rather than continuously.

The features term extractor 2, term store 3, abnormality determiner 4, flexi-clusterer 5, and alert generator 6 may be implemented by a computer system arranged to run one or more computer programs. The term store 3 may be implemented by computer readable memory, e.g. persistent computer readable memory.

The system 1 may be arranged to receive the data stream from the servers holding the text documents via a local network, and/or via the internet. According to various embodiments, the system 1 can process a minimum of 5000 text documents received from the data stream.

Similarly the system 1 may be arranged to communicate with the electronic message server in order to send alerts, via a local network connection and/or via the internet.

The present subject matter can be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a conversion to another language, code or, notation; and b reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory ROM, flash memory, disk drive memory, CD-ROM, and other permanent storage. Additionally, a computer medium may include volatile storage such as RAM, buffers, cache memory, and network circuits. Furthermore, in certain embodiments of the computer readable medium, other than a computer readable storage medium as discussed above, the computer readable medium may comprise computer readable information in a transitory state medium such as a network link and/or a network interface, including a wired network or a wireless network, that allow a computer to read such computer readable information.

The Abstract is provided with the understanding that it is not intended be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

Although specific embodiments are illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein. The scope of the disclosure is not to be restricted, therefore, to the specific embodiments, and it is intended that the appended claims cover any and all such applications, modifications, and embodiments within the scope of the present disclosure.

What is claimed is:

What is claimed is:
1. A system comprising:
a client device; and
a computer-readable medium coupled to the client device having instructions stored therein which, when executed by the client devices, cause the client device to perform operations comprising:
    receiving, by the client device, text documents forming part of a data stream from one or more servers;
    identifying, using a term extractor, terms within the received text documents by employing at least one of a plurality of natural language processing processes on the received text documents to extract the terms;
    associating with each extracted term an identifier for each text document in which the term is found and associating with each term time information associated with each text document in which the term is found, wherein the time information includes a system time the text document was received;
    generating a model for each term, the model describing a pattern of occurrences for the term in the data stream over a historic period;
    deriving from the identified terms, using an abnormality determiner, a set of terms identified as abnormal by virtue of having a relatively high frequency of occurrence within the text documents of the data stream received in a first recent period compared with that expected from the models;
    creating a first set of one or more cluster using a flexi-clusterer based on at least one of a plurality of clustering analysis models, each cluster being associated with one of a plurality of topics, further each cluster including a subset of terms from the set of terms identified as abnormal which are considered to relate to a same topic as the topic of the cluster of the first set of clusters the subset of terms of the set of terms identified as abnormal is included in;
    deriving from the identified terms, using the abnormality determiner, a further set of terms identified as abnormal by virtue of having a relatively high frequency of occurrence within the text documents of the data stream received in a second recent period compared with that expected from the models;
    creating a further set of one or more clusters using the flexi-clusterer based on at least one of the plurality of clustering analysis models; each cluster being associated with one of the plurality of topics, further each cluster including a subset of terms from the further set of terms identified as abnormal which are considered to relate to the same topic as the topic of the cluster of the further set of clusters the subset of terms of the further set of terms determined as abnormal is included in; and
    comparing, using a comparator, each of the one or more clusters of the further set with each of the one or more clusters of the first set to determine whether a cluster of the further set is associated with the same topic as any cluster of the first set, and
    where the topic of one of the clusters of the further set does not pertain to any of the topics of the clusters of the first set, adding that cluster to the first set of clusters.

2. A system according to calm 1, wherein time information associated with each text document in which the system comprises:
    for each term, determining an indicator of a frequency that the term has occurred within the received text documents from the data stream with the first recent period;
    comparing the indicator of the frequency for a term with the model relevant for that term, and using the comparison to apply an abnormality score to the term; the abnormality score being indicative of an extent to which the frequency of the term within the first recent period is predicted by the model; and
    using the abnormality scores to determine the set of terms that are abnormal by virtue of having a relatively high frequency of occurrence in the first recent period compared with that predicted by the model.

3. A system according to claim 2 comprising:
    determining a new indicator of the frequency for each term based on the frequency that the term has occurred within received text documents from the data stream within the second recent period; using the new indicators of frequency to update the models and abnormality scores for the terms; and using the updated models and abnormality scores to determine the further set of terms that are abnormal.

4. A system according to claim 1, wherein when it is determined that a cluster of the further set relates to the same topic as a cluster of the first set, adding terms from the cluster of the further set that are not present in the cluster of the first set to the cluster of the first set.

5. A system according to claim 1, comprising additionally comparing clusters within the first set of one or more clusters to determine whether any relate to the same topic, and wham such a determination is mads, merging the clusters determined to relate to the same topic.

6. A system according to claim 2, comprising reviewing the abnormality score of terms within a cluster of the first set, and removing the cluster from the first set if the reviewed cluster no longer comprises terms that from their abnormality score are abnormal terms.

7. A system according to claim 1, comprising an alert generator arranged to generate an alert in response to a new cluster being added to the first set of clusters, the alert comprising information of the new cluster.

8. A system according to claim 1; comprising providing information to an electronic message server in response to determining that a cluster of the further set does not pertain to the same topic as a cluster of the first set, the information identifying or comprising one or more of: the determined cluster, the topic of the determined cluster, and text documents in which two or more terms of the determined cluster co-occurred.

9. A computer implemented method comprising:
    receiving, by a client device, text documents forming part of a data stream from one or more servers;
    identifying, using a term extractor, terms within the received text documents by employing at least one of a plurality of natural language processing processes on the received text documents to extract the terms;
    associating with each extracted term an identifier for each text document in which the term is found and associating with each term time information associated with each text document in which the term is found, wherein the time information includes a system time the text document was received;
    generating a model for each term, the model describing a pattern of occurrences for the term in the data stream over a historic period;

deriving from the identified terms, using an abnormality determiner, a set of terms identified as abnormal by virtue of having a relatively high frequency of occurrence within the text document of the data stream received in a first recent period compared with that expected from the models;

creating a first set of one or more clusters, using a flexi-clusterer, based on at least one of a plurality of clustering analysis models, each cluster being associated with one of a plurality of topics, further each cluster including a subset of terms from the set of terms identified as abnormal which are considered to relate to a same topic as the topic of the cluster of the first set of clusters the subset of terms of the set of terms identified as abnormal is included in;

deriving from the identified terms, using the abnormality determiner, a further set of terms identified abnormal by virtue of having a relatively high frequency of occurrence within the text document of the data stream received in a second recent period compared with that expected;

creating a further set of one or more clusters using the flexi-clusterer based on at least one of the plurality of clustering analysis models; each cluster being with one of the plurality of topics, further each cluster including a subset of terms from the further set of terms identified as abnormal which are considered to relate to the same topic as the topic of the cluster of the further set of clusters the subset of terms of the further set of terms determined as abnormal is included in;

comparing, using a comparator, each of the one or more clusters of the further set with each of the one or more clusters of the first set to determine whether a cluster of the further set is associated with the same topic as any cluster of the first set; and where the topic of one of the clusters of the further set does not pertain to any of the topics of the clusters of the first set, adding that cluster to the first set of clusters.

10. A method according to claim 9 wherein the time information associated with each text document in which the method comprises:

for each term, determining an indicator of a frequency that the term has occurred within the received text documents from the data stream within the first recent period;

comparing the indicator of the frequency for a term with the model relevant for that term, and using the comparison to apply an abnormality score to the term; the abnormality score being indicative of an extent to which the frequency of the term within the first recent period is predicted by the model; and using the abnormality scores to determine the set of terms that are abnormal by virtue of having a relatively high frequency of occurrence in the first recent period compared with that predicted by the model.

11. A method according to claim 10 comprising:

determining a new indicator of the frequency for each term based on the frequency that the term has occurred within received text documents from the data stream within the second recent period; using the new indicators of frequency to update the models and abnormality scores for the terms; and using the updated models and abnormality scores to determine the further set of terms that are abnormal.

12. A method according to claim 9, comprising providing information to an electronic message server of new clusters that are added to the first set of clusters.

13. A non-transitory computer storage medium encoded with a computer program, the program comprising instructions that when executed by a client device cause the client device to perform operation comprising:

receiving, by the client device, text documents forming part of a data stream from one or more servers;

identifying, using a term extractor, terms within the received text document by employing at least one of a plurality of natural language processing process on the received text documents to extract the terms and associating with each term:

an identifier for each text document in which the term is found; and time information associated with each text document in which the term is found, wherein the time information includes a system time the text document was received;

generating a model for each term, the model describing a pattern of occurrences for the term in the data stream over a historic period;

for each term, determining an indicator of a frequency that the term has occurred within the received text document from the data stream within a first recent period;

comparing the indicator of the frequency for a term with the model relevant for that term, and using the comparison to apply an abnormality score to the term; the abnormality score being indicative of an extent the frequency of the term within the first recent period is predicted by the model;

using the abnormality scores to determine a set of terms that are abnormal by virtue of having a relatively high frequency of occurrence in the first recent period compared with that predicted by the model;

creating a first set of one or more clusters, using a flexi-clusterer based on at least one of a plurality of clustering analysis models, each cluster being associated with one of a plurality of topics, further each cluster including a sunset of terms from the set of terms identified as abnormal which are considered to relate to a same topic as the topic of the cluster of the first set of cluster the subset of terms of the set of terms identified as abnormal is included in;

determining a new indicator of the frequency for each term based on the frequency that the term has occurred within received text documents from the data stream within a second recent period; using the new indicators of frequency to update the models and abnormality scores for the terms and using the updated models and abnormality scores to determine a further set of terms that are abnormal;

repeating clustering process using the further set of abnormal terms to create a further set of one or more clusters;

comparing, using a comparator, each of the one or more clusters of the further set with each of the one or more clusters of the first set to determine a cluster of the further set is associated with the same topic as any cluster of the first set; and where the topic of one of the of the clusters of the further set does not pertain to any of the topics of the clusters of the first set, adding that cluster to the first met of clusters.

* * * * *